Nov. 20, 1962     R. F. TABER     3,064,472

COMPRESSION TYPE FORCE TRANSDUCER

Filed Nov. 21, 1960

INVENTOR.
RALPH F. TABER
BY
ATTORNEY

United States Patent Office 3,064,472
Patented Nov. 20, 1962

3,064,472
COMPRESSION TYPE FORCE TRANSDUCER
Ralph F. Taber, 111 Goundry St.,
North Tonawanda, N.Y.
Filed Nov. 21, 1960, Ser. No. 70,577
7 Claims. (Cl. 73—141)

This invention relates to a transducer for measuring forces such as compression forces created by loads on various type of equipment.

The invention provides a load cell for use in measuring load in aircraft, missiles, land vehicles, weighing equipment and the like, constructed to eliminate side stresses in the operation of the transducer for more efficiently measuring the load.

The invention provides a transducer having the casing carrying the force responsive means mounted on a universal joint member supported for free movement on a complementary joint member carried by one load member while the transducer has a force transmitting member provided with a universal joint connection with another load member so the load or force between the two members may be measured. The joint members carrying the transducer and the universal joint connection for the froce transmitting member provide for relative movement of the transducer to the load members so the effect of side stresses on the transducer are minimized for more accurate measurement of the lineal load forces.

According to the invention, a casing is provided having a cap and a base. The casing is tubular in order to slidably extend through an opening in an inner joint member. The casing is detachably and rigidly mounted in the inner joint member by having a shoulder on one end engage one side of the joint member and the other end provided with detachable parts engaging the other side of the joint member. A force responsive member is mounted on the base within the casing and an auxiliary casing extends from the base to house portions of the electrical measuring equipment. The cap on the casing is formed with a tubular extension forming a guide for a force transmitting member positioned to transmit lineal forces to the force responsive member for measurement. The free end of the force transmitting member extends beyond the cap where it carries a universal joint for connection with a load member. The joint structures and cap are provided with a plastic lubricant film, such as Teflon, for eliminating clearance between the joint members and at the same time providing free movement between the relatively movable parts. An outer joint member is detchably mounted in a frame and is formed of a pair of sections for receiving and assembling the inner joint member. The frame has a flange extending outwardly for attachment to a load member. The casing and force transmitting member in being attached by relatively movable joint structures between a pair of load members, provides a self-aligning feature that substantially eliminates side stresses so lineal force measurements will be substantially accurate.

Figure 1:
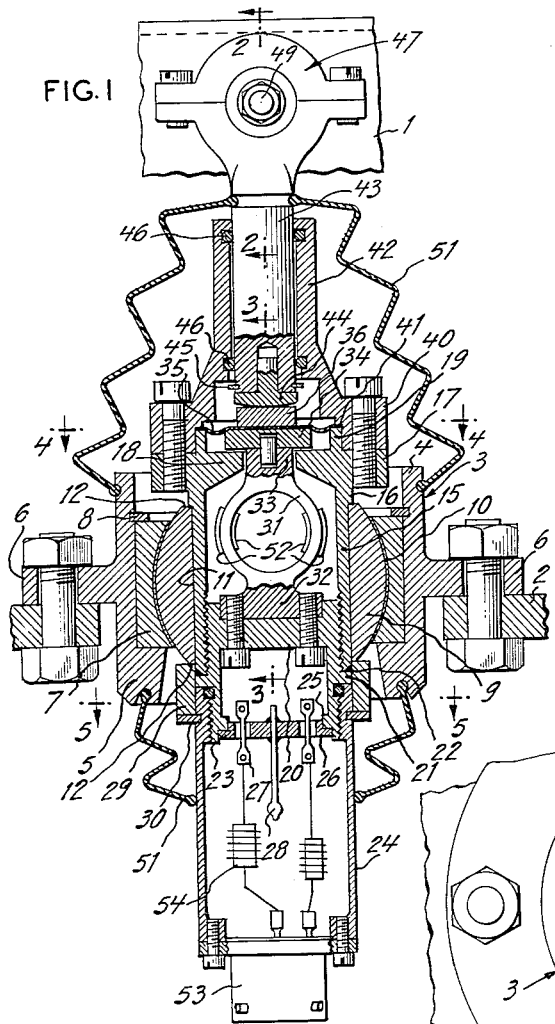
FIG. 1 is a vertical transverse cross section through the transducer constructed according to the invention with portions shown in elevation for convenience in illustration.

A pair of load members are diagrammatically indicated at 1 and 2 which are arranged in spaced relation to each other and may be any parts of a structure where it is desired to measure the load stresses between the parts. For measuring the stresses between load members 1 and 2, the invention provides a supporting member or frame 3 having a tubular portion 4 formed with an inwardly directed flange 5 on the lower end and an outwardly extending flange or lugs 6 on the central portion. Lugs 6 provide means for securing the frame to load member 2. An outer joint member 7 is formed of a pair of sections slidably engaged in tubular member 4 having a tight fit to eliminate clearance. Outer joint member 7 has one end engaged with flange 5 and the opposite end engaged by split retaining ring 8 detachably inserted in an annular groove on the inner face of tubular portion 4 and having one face engaging the other end of the joint member opposite to that engaged with flange 5. Outer joint member 7 is formed with a central aperture having a partially spherical inner face to provide an outer universal joint member. An inner joint member 9 has an outer partially spherical surface rotatably engaging within the inner opening in outer joint member 7 to provide a universal joint through cooperation of the partially spherical faces of the inner and outer joint members. A plastic lubricant film 10 formed of a substantially solid non-compressible material, such as the material known by the trade-name Teflon, is applied between the partially spherical faces of the inner and outer joint members, as illustrated in the drawing. These joint members and the intermediate film are constructed so they are readily movable in all directions to each other in rotary movement without having clearance between them so that relative axial movement of the inner joint member relative to the outer joint member is eliminated. The supporting frame and joint members are constructed to have a high degree of precision between the parts for eliminating clearance and at the same time provide free relative movement.

Inner joint member 9 is formed with a longitudinally extending cylindrical or tubular aperture 11 having seat portions 12 formed on opposite ends about tubular aperture 11. A transducer casing 15 of tubular or cylindrical shape, as shown in the drawing, is slidably engaged in aperture 11 of inner joint member 9 with shoulder 16 extending outward at one end portion thereof engaged with seat portion 12 on one end of joint member 9. This same end of casing 15 extends outwardly beyond the shoulder portion 16 where it is formed with a supporting flange 17, an end wall 18 and an annular or tubular seating portion 19 forming a recess within the seating portion about a central opening in end wall 18.

The opposite end of casing 15 has a base 20 threaded into the lower end of the casing. Base 20 has a radial flange 21 extending outwardly and having an outer dimension or size equal to that of the outer surface of the casing. This radial flange 21 is adapted to seat on the lower end of casing 15. The lower end of casing 15 has the outer marginal portion cut away to provide a groove to receive a sealing compound such as solder, indicated at 22, for hermetically sealing the joint between the base and the casing. Base 20 has a cylindrical extension 23 projecting outwardly from flange 21. The outer surface of cylindrical extension 23 is threaded to detachably mount tubular housing or casing extension 24 having the same size or diameter as casing 15 and projecting outwardly therefrom in coaxial relation. Base 20 is formed with an inwardly extending annular flange 25 forming a seat for terminal plate 26 secured thereto in hermetically sealed relation and having a plurality of electrical terminal members 27 extending through the terminal plate in sealed insulated relation. A tube 28 is extended through the central portion of terminal plate 26 to provide a means for receiving a connection from an evacuating apparatus for evacuating the interior of casing 15. When the vacuum is completed to the desired degree within casing 15, tube 28 is deformed in order to provide a seal for maintaining the vacuum.

A collar 29 is slidably engaged over the outside of tubular housing 24. One end of collar 29 engages seat portion 12 on inner joint member 9 at the end opposite the engagement by shoulder 16 on casing 15. A split retaining ring 30 is detachably mounted in a seating groove in tubular housing 24 in position to rigidly retain casing 15 and tubular housing 24 against longitudinal movement in inner joint member 9.

A force responsive member 31, such as a sensing ring, has base portion 32 secured to base 20 and a projecting end 33 extending from the opposite side through the opening in end wall 18 of casing 15. The terminal portion of projecting end 33 terminates in the recess formed on the outside of end wall 18 and mounts a piston 34 held in position on projecting end 33 by a suitable centering and retaining pin. The outer face of piston 34 terminates and lies in substantially the same plane as the end of seating portion 19. A fluid and vapor barrier 35 is mounted over the surface of piston 34 and has the outer marginal portion secured to seat portion 19 to hermetically seal the end of the casing. Barrier 35 is formed with a bead portion between piston 34 and seat portion 19 to provide for free movement of the piston to transmit force to force responsive member 31 within the casing. This construction may be of the type disclosed in applicant's co-pending application Serial Number 796,149, filed February 27, 1959, now Patent No. 3,024,649, which shows a suitable type of force responsive member and associated parts for use in connection with the present invention.

A force transmitting disc 36 is mounted in axial relation to piston 34 on the outside surface of barrier 35 and suitably secured thereto by solder or other sealing means. Barrier 35 will normally be formed of a thin film of metal which will provide for attachment of disc 36 thereto. A cap 40 is provided for casing 15 and is suitably secured thereto by bolts or other fastening means. Cap 40 is provided with an annular shoulder 41 arranged to seat against the margin of barrier 35 in opposed relation to the end of seating portion 19 for securely holding the margin of the barrier sealed against seating portion 19. Cap 40 has a cylindrical or tubular extension 42 projecting outwardly in axial relation beyond the end of casing 15, as shown in FIG. 1, for slidably receiving a cylindrical or tubular force transmitting member or plunger rod 43. A head 44 is detachably mounted on the inner end of member 43. Head 44 may be formed of suitable hardened material for engaging force transmitting disc 36 in transmitting forces from member 43 through disc 36 to force responsive member 31. Head 44 is rigidly mounted on the end of member 43 against movement relative thereto. A split retaining ring 45 is detachably mounted in a groove formed on the inner end of tubular force transmitting member 43 for detachably retaining member 43 slidably engaged in the cap. Cap 40 is formed with a chamber about force transmitting disc 36 and the inner end of member 43 carrying head 44 to accommodate the retaining ring in a manner as shown in FIG. 1 of the drawing. Bearing rings 46 formed of a solid plastic lubricant material are mounted in grooves in the opposite end portions of cylindrical extension 42 of the cap member to engage the outer surface of tubular force transmitting member or plunger rod 43 for taking up all clearance between member 43 and extension 42 on the cap and at the same time providing free longitudinal movement of tubular force transmitting member 43 in extension 42 for transmitting lineal forces to force responsive member 31 in the casing. These bearing rings may be made of any suitable material, such as a lubricant plastic material known by the trade name of Teflon.

Figure 2:
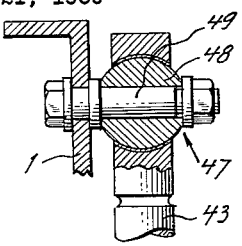
FIG. 2 is a vertical fragmentary cross section taken on line 2—2 of FIG. 1.
Figure 3:
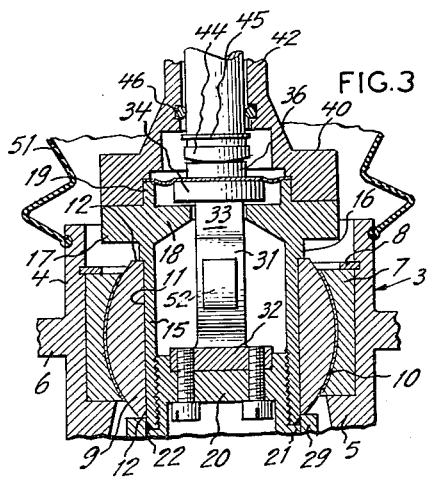
FIG. 3 is a vertical fragmentary cross section taken on line 3—3 of FIG. 1.
Figure 4:
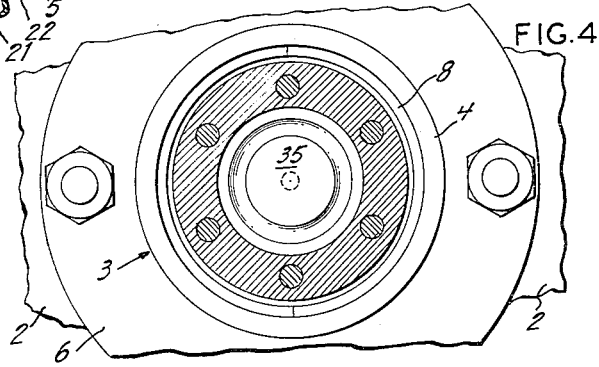
FIG. 4 is a transverse cross section taken on line 4—4 of FIG. 1 with portions broken away.
Figure 5:
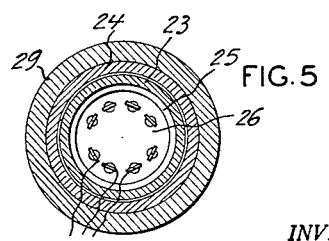
FIG. 5 is a horizontal cross section taken on line 5—5 of FIG. 1.

The outer end of force transmitting member or plunger rod 43 is formed to provide a joint member 47 of two parts bolted together and formed with a central opening having an inner partially spherical surface to provide an outer member of a universal joint. An inner ball member 48 is mounted in outer member 47 for relative universal or rotative movement and is tightly retained against relative movement to member 47 by a plastic lubricant film of the character heretofore mentioned so as to take up all clearance in the joint and prevent relative movement between inner ball member 48 and outer joint member 47. Inner ball member 48 is formed with a central aperture for receiving an attaching bolt 49 adapted to secure inner ball member 48 to load member 1, as shown in FIGS. 1 and 2. Ball member 48 and joint member 47 provide a universal joint connection between force transmitting member 43 and load member 1 so that with the universal joint connection between force transmitting member 43 and load member 1 and the universal joint connection between casing 15 and supporting member 3, the transducer construction is arranged to have relative movement between the load members in the event that the load members have a slight lateral movement between them.

Tubular member 4 is provided at the upper and lower ends with annular grooves on the outer side for receiving and mounting one end of a pair of flexible protective covers or boots 51 while the opposite ends are engaged with the outer end of tubular housing 24 and force transmitting member 43 respectively, as shown in FIG. 1. These flexible covers or boots are provided for preventing foreign matter such as dust etc., from entering into the ends of the cylindrical extension 42 and tubular member 4 of the supporting frame 3 so as to prevent interference with the free operation of the transducer.

Figure 6:
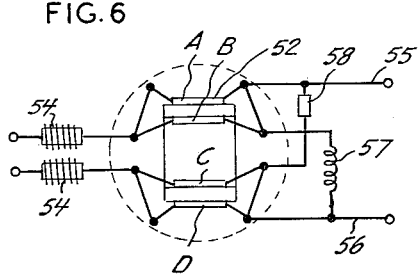
FIG. 6 is a diagrammatic view showing the electrical connections to the resistance strain gauges carried by the force responsive member.

Force responsive member 31 includes suitable means responsive to force variations applied to member 31, such as strain gauges 52, applied to the inner and outer faces of member 31, as indicated diagrammatically in FIG. 1. These strain gauges may be of the resistance type and have electrical circuit connections which extend to terminal members 27 where the circuits may pass independently through terminal plate 26 for electrical connection with apparatus outside of the hermetically sealed casing. FIG. 6 shows a wiring diagram illustrating strain gauges 52. The four gauges are indicated in FIG. 6 as A, B, C and D. Tubular housing 24 is provided on the outer end with a plug receptacle 53 for detachably receiving an electrical connector of conventional design carrying a sufficient number of wires to electrically connect the strain gauge circuit connections with the registering or recording apparatus of a type well known in the art. Tubular housing 24 may be used to contain electrical components 54 providing sensitivity adjustments in the input circuit as indicated in FIG. 6. These sensitivity adjustments are in each side of the two input circuit connections which extend to the strain gauges. One input circuit connection through one of the electrical sensitivity adjustments or components 54 is connected to strain gauges A and B while the other component 54 forms a sensitivity adjustment connected with strain gauges C and D. The output circuit for the four strain gauges has output circuit wires 55 and 56 connected with strain gauges A and D respectively. Strain gauge B is connected with output circuit 56 through an electrical component 57 inserted to provide a zero balance in the circuit. An electrical component 58 is inserted in a circuit between strain gauge C and wire connection 55 and is used to provide temperature compensation in the output circuit. These components may all be included in tubular housing 24. The output circuit from wires 55 and 56 extends to suitable recording or registering equipment for measuring stress or force variations applied to force responsive member 31 for measuring load conditions between load members 1 and 2. Any suitable mechanism for measuring force variations applied to force responsive member 31 may be used with this invention including any suitable type of force responsive member.

With the construction described above it will be understood that when load members 1 and 2 move relative to each other in the machine or other apparatus of which they form a part, there may be relative lateral movement between load members 1 and 2. By the provision of the two universal joint constructions in which inner joint member 9 is constructed to form an assembled part of casing 15 carrying the force responsive member, provision is made for relative movement of inner joint member 9 to the load, so that side stresses between load members 1 and 2 are eliminated. The universal joint connection between force transmitting member 43 and load member 1 also provides for free movement between member 43 and load member 1 so that slight relative movement between the load members will eliminate the application of side stresses to member 43 in which the universal joint will provide for relative movement for this purpose. In this way, lineal load forces or stresses are directly applied with the substantial elimination of all side stresses so as to obtain a highly efficient operation of the transducer in measuring the lineal load forces.

The transducer construction includes a combination of elements in which supporting frame 3 is constructed to detachably receive the inner and outer joint members so that they may be assembled and disassembled in a convenient manner and constructed at a minimum of cost. The mounting of the transducer casing 15 provides an efficient combination with inner joint member 9 in which the load stresses are applied directly to member 9 between opposite ends thereof for direct transmission to supporting frame 3. This structural arrangement of casing 15 and the force responsive member to inner and outer joint members 9 and 7 respectively, without lost motion due to clearance between the parts provides a highly sensitive and efficient load cell for measuring lineal load forces.

The invention claimed is:

1. A transducer of the character described comprising a casing having a body, a base and a cap, a universal joint formed of a pair of members movable one in the other, said casing being mounted on one of said members, a supporting frame carrying the other of said members, force responsive means mounted on said base in said casing, a force transmitting member slidably mounted in said cap for transmitting force variations to said force responsive means, for measurement, and means on the free end of said force transmitting member for connecting it to a load, whereby said universal joint provides for relative movement of said casing to said frame with variations in the position of the load to eliminate side thrust in said casing and frictional error in making compression measurements.

2. A transducer of the character described comprising a supporting frame, a pair of members mounted one on the other having one supported by said supporting frame and the other having universal movement relative to said one member, a casing mounted on said other of said pair of members having a cap, force responsive means mounted in said casing and a force transmitting member slidable in said cap having one end positioned to transmit force to said force responsive means and the opposite end extending beyond said cap for connection to a load, whereby said casing and force transmitting member are movable with variations in the position of said load by relative universal movement of said pair of members to each other for eliminating side stresses during operation of the transducer.

3. A transducer as claimed in claim 2, comprising a universal joint mounted on the outer end of the force transmitting member and having means connecting said joint with a load and providing for relative movement between the load and force transmitting member.

4. A transducer of the character described, comprising a supporting frame, an outer universal joint member mounted in said frame having a partially spherical bearing socket defining a central opening therein, an inner universal joint member formed with a partially spherical outer face having bearing engagement in said bearing socket in said outer member for universal movement therein, said inner joint member formed with a central aperture, a casing having a cap and a base on opposite ends slidably engaged in the central aperture in said inner joint member, said casing having a shoulder engaging said inner joint member at one end of said central aperture, retaining means connected to said base and engaging said inner joint member at the opposite end of said central aperture for attaching said casing to said inner joint member, force responsive means mounted in said casing between said base and cap, a force transmitting member slidable in said cap having one end positioned to transmit forces to said force responsive means, and means for attaching the other end of said force transmitting member to a load to be measured.

5. A transducer as claimed in claim 4 having a film element extending between said spherical bearing socket and said spherical outer face of said inner and outer joint members respectively for eliminating relative movement between said joint members and lubricating said socket and outer face of said members for free rotative movement in any direction.

6. A transducer of the character described comprising a supporting frame having a tubular portion open at opposite ends, an outer joint member slidably mounted in said tubular portion, means retaining said outer joint member rigidly attached to said supporting frame, said outer joint member having a central aperture formed therein with a partially spherical bearing surface, an inner joint member having a central aperture and an outer partially spherical bearing surface extending between opposite ends of said aperture slidably engaged with said spherical bearing surface for relative universal movement, a casing slidably engaged in said central aperture in said inner joint member with opposite ends extending beyond opposite sides of said inner joint member, means on opposite ends of said casing rigidly retaining said casing in said inner joint member, force responsive means mounted in said casing, a supporting flange on one end of said casing, a cap member having one end detachably mounted on said flange on said casing and having a tubular portion extending outwardly from said casing, a rod slidably mounted in the tubular portion of said cap having one end positioned to transmit forces applied thereto to said force responsive means and the opposite end extending beyond said cap, and means for connecting said opposite end of said rod to a load member for relative angular adjustment to said load member while transmitting force to said force responsive means for measurement.

7. A transducer of the character described comprising a supporting frame having a tubular body portion formed with an inwardly extending marginal flange on one end and outwardly extending attaching means for connection with a load member, an outer joint member slidably mounted in said body portion means detachably retaining said outer joint member engaged with said flange, said outer joint member being formed with a central partially spherical inner face forming an aperture extending through said joint member in axial relation, an inner joint member having a central aperture therein and an outer partially spherical surface slidably seated in said outer joint member in opposed relation to the spherical inner face thereon, a solid lubricant film contacting the inner and outer partially spherical surfaces of said outer and inner joint members for eliminating clearance between said members while providing for free universal relative movement between them, a casing slidably mounted in said opening in said inner joint member having a shoulder on one end engaging said inner joint member about one end of said central aperture, means detachably engaging the inner joint member at the other end of said central aperture and said casing for rigidly mounting said casing in said inner joint member, a cap mounted on one end of said casing having a tubular guide portion extending in aligned relation outwardly from said casing, a force responsive means mounted in said casing, a plunger rod slidable in said tubular guide portion having the inner end engaging said force responsive means for transmitting force thereto, a solid lubricant body between said tubular guide portion and said plunger rod to take up clearance between said guide portion and rod and provide free longitudinal movement, and a universal joint mounted on the free end of said arm having one member adapted for attachment to a load for relative movement between said rod and the load, whereby said casing and rod are freely movable in unstressed relation to measure forces applied thereto by relative movement of the load.

References Cited in the file of this patent

UNITED STATES PATENTS

| | | |
|---|---|---|
| 2,775,887 | Hines | Jan. 1, 1957 |
| 2,820,624 | Koegel | Jan. 21, 1958 |
| 2,920,880 | Laycock | Jan. 12, 1960 |